United States Patent [19]
McDowell

[11] Patent Number: 4,759,606
[45] Date of Patent: Jul. 26, 1988

[54] COLLAPSIBLE REFLECTOR ASSEMBLY

[76] Inventor: Robert A. McDowell, 1920 North 48th Ave., Hollywood, Fla. 33021

[21] Appl. No.: 3,246

[22] Filed: Jan. 14, 1987

[51] Int. Cl.$^4$ .................. G02B 5/12; G09F 13/16; E01F 9/10; E01F 13/00
[52] U.S. Cl. ............................ 350/97; 40/582; 40/903; 116/63 P; 404/6; 404/9; D10/109
[58] Field of Search ............ 40/582, 583, 903; 116/63 P, 63 R, 63 T; 248/166, 188.6, 431; 350/97; 404/6, 9; D10/109, 114

[56] References Cited

U.S. PATENT DOCUMENTS

| | | | |
|---|---|---|---|
| 3,056,377 | 10/1962 | Nelson | 116/63 |
| 3,223,387 | 12/1965 | Magliocco | 116/63 P |
| 3,262,415 | 7/1966 | Biscardi | 116/63 |
| 3,830,488 | 8/1974 | Wilger et al. | 248/166 |
| 3,908,581 | 9/1975 | Zeizel | 350/97 |
| 3,949,701 | 4/1976 | Teixeira | 116/63 P |
| 4,047,798 | 9/1977 | Bennett | 350/97 |
| 4,134,643 | 1/1979 | Lee | 350/97 |

FOREIGN PATENT DOCUMENTS 783961  4/1968  Canada ........................... 116/63 P Primary Examiner—John K. Corbin
Assistant Examiner—Ronald M. Kachmarik
Attorney, Agent, or Firm—Oltman and Flynn

[57] ABSTRACT

A reflector assembly for use on the road by a vehicle driver near his or her stopped vehicle comprising three reflective arms crossing and pivoted to each other at the middle, and bases pivotally connected to two of the arms at one end of each. When the assembly is erected, the crossing arms are spread apart angularly and the bases hold their respective arms extending up diagonally. Wing nuts at the pivots releasably clamp the arms and bases in this position. After loosening the wing nuts, the user can collapse the reflector assembly to a folded position in which the arms are aligned one behind the other.

2 Claims, 2 Drawing Sheets

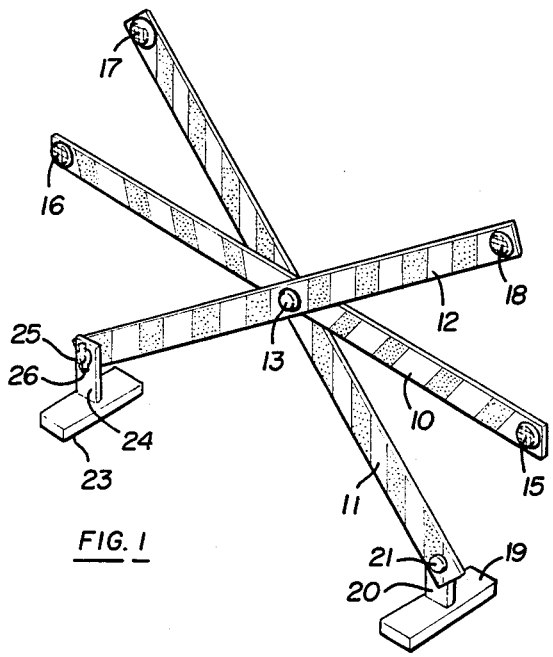
FIG. 1
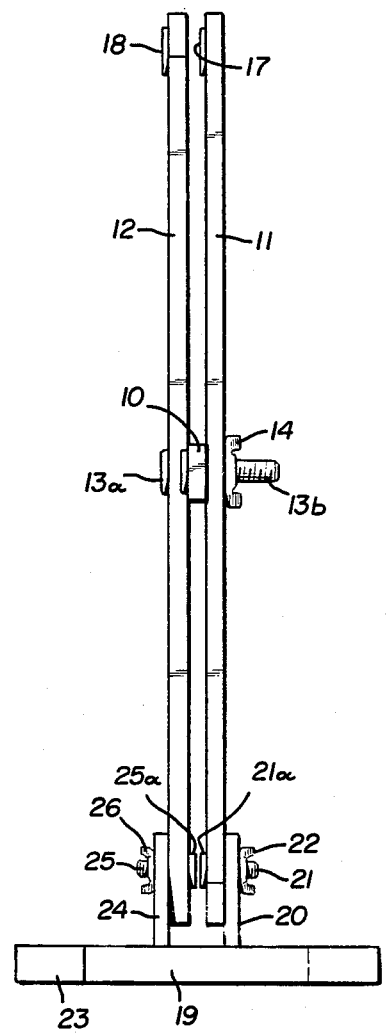
FIG. 3
FIG. 2
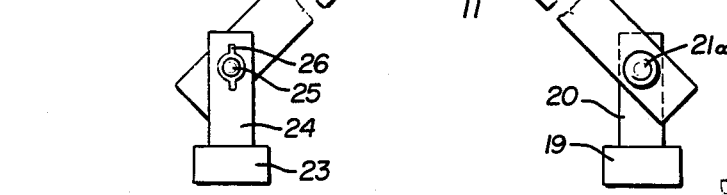
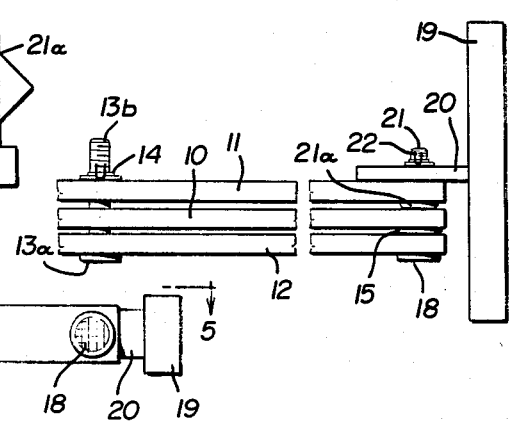
FIG. 5
FIG. 4

(1)

COLLAPSIBLE REFLECTOR ASSEMBLY

SUMMARY OF THE INVENTION

This invention relates to a collapsible reflector assembly for use by a vehicle driver to place near his or her vehicle in case of a vehicle breakdown or other emergency on the road.

A principal object of this invention is to provide a novel reflector assembly for this purpose which is readily convertible from a collapsed position for storage in the vehicle to an erected, operative position on the road, or vice versa.

Preferably, the present reflector assembly has a plurality of elongated, thin, substantially flat arms pivotally interconnected midway between the opposite ends of each, and respective bases pivotally connected individually to two of the arms at one end of each. Manually releasable clamps, preferably wing nuts, are provided at the pivots for either clamping the reflector assembly in its erected position with the arms spread apart angularly above the two bases or clamping it in its collapsed position with the arms aligned with each other, one behind the other, and at least part of each base aligned with the arms for convenience of storage.

Futher objects and advantages of this invention will be apparent from the following detailed description of certain presently preferred embodiments, which are illustrated in the accompanying drawings.

DESCRIPTION OF THE DRAWINGS

FIG. 1 is a perspective view of a first embodiment of this invention;

FIG. 2 is a front elevation of this embodiment with a "help" sign added;

FIG. 3 is a side elevation taken from the right side of FIG. 1;

FIG. 4 is a front elevation showing the reflector in its collapsed, folded-up condition;

FIG. 5 is a fragmentary side elevation of the reflector in its collapsed condition, taken along the line 5—5 in FIG. 4;

Figure 6:
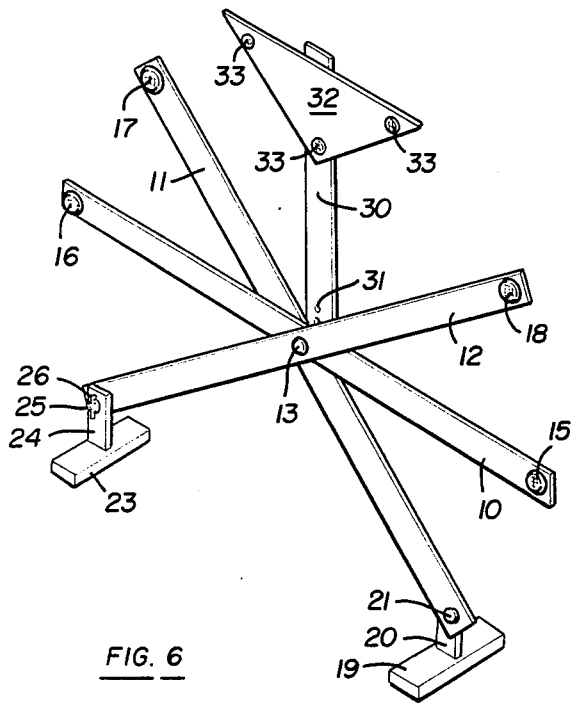
FIG. 6 is a perspective view of a second embodiment of this invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

Referring to FIG. 1, in this embodiment of the invention the reflector has three thin, flat, elongated, substantially rigid arms 10, 11 and 12 of equal length and identical rectangular outline. Midway between the opposite ends of each arm they are pivotally interconnected by a bolt 13. As shown in FIG. 3 this bolt has an enlarged head 13a engaging the front of the forwardmost arm 12 in the assembly and a screw-threaded shank passing through slightly larger openings in the three arms. A clamping device in the form of a wing nut 14 threadedly engages the shank 13b of pivot bolt 13 behind the rear arm 11 in the assembly.

As shown in FIG. 1, the middle arm 10 carries light reflectors 15 and 16 on the front near its opposite ends. Arm 11 carries a light reflector 17 on the front near the end which is its upper end when the reflector assembly is in its erected position, shown in this Figure. Similarly, arm 12 carries a light reflector 18 on the front near what is its upper end in the erected position of the reflector assembly.

In addition to these light reflectors 15-18, the arms 10-12 preferably have light-reflective material on the front, or on both the front and back, along the full length of each arm.

At its lower end in FIG. 1 the arm 11 is pivotally connected to a base which has a horizontal segment 19 with a flat bottom face and an upstanding vertical segment 20. The bottom segment 19 extends substantially perpendicular to the plane of arm 11 and it projects on opposite sides of this arm to provide a stable support for the right end of the reflector assembly, as seen in this Figure. The upstanding segment 20 of this base extends up from the bottom piece 19 immediately behind arm 11 and parallel to the plane of that arm. Arm 11 is pivotally connected to the upstanding segment 20 of the base by a bolt 21 passing through registering holes in arm 11 and segment 20. As shown in FIG. 3, the pivot bolt has an enlarged head 21a engaging the front of arm 11. A wing nut 22 threadedly engages the screwthreaded shank of bolt 21 behind the upstanding segment 20 of the base for releasably clamping the arm to the base.

At its lower end in FIG. 1 the arm 12 is pivotally connected to a base which has a horizontal segment 23 with a flat bottom face and an upstanding vertical segment 24. The bottom segment 23 extends substantially perpendicular to the plane of arm 12 and it projects on opposite sides of this arm to provide a stable support for the left end of the reflector assembly, as seen in this Figure. The upstanding segment 24 of this base extends up from the bottom piece 23 immediately in front of arm 12 and parallel to the plane of that arm. Arm 12 is pivotally connected to the upstanding segment 24 of the base by a bolt 25 passing through registering holes in arm 12 and segment 24. As shown in FIG. 3, this pivot bolt has an enlarged head 25a engaging the back of arm 12. A wing nut 26 threadedly engages the screw-threaded shank of bolt 25 in the front of the upstanding segment 24 of the base for releasably clamping the arm to the base.

When used on a road, the reflector assembly is in its erected position (FIG. 1) with the horizontal segments 19 and 23 of its bases engaging the road surface. The wing nuts 22 and 26 are tightened to hold the respective arms 11 and 12 extending diagonally up from the bases, and the wing nut 14 is tightened to clamp the middle arm 10 extending substantially horizontally between the diagonal arms 11 and 12.

As shown in FIG. 2 a sign 27 displaying the word "help" or some other appropriate message may be mounted on the reflector assembly by flexible lines 28 and 29, the ends of which are wrapped around the reflectors 18 and 17 on the upper ends of arms 12 and 11, respectively.

When the reflector assembly is to be put in the trunk of a car, the wing nuts 14, 22 and 26 are loosened, the pivoted arms 10, 11 and 12 are folded up into direct alignment and closely spaced relationship, one behind the other, the vertical segment 20 of the right base in FIG. 1 is aligned with the arm 11, and the vertical segment 24 of the left base in FIG. 1 is aligned with the arm 12. FIGS. 4 and 5 shows the reflector assembly in its folded, inoperative condition.

Figure 7:
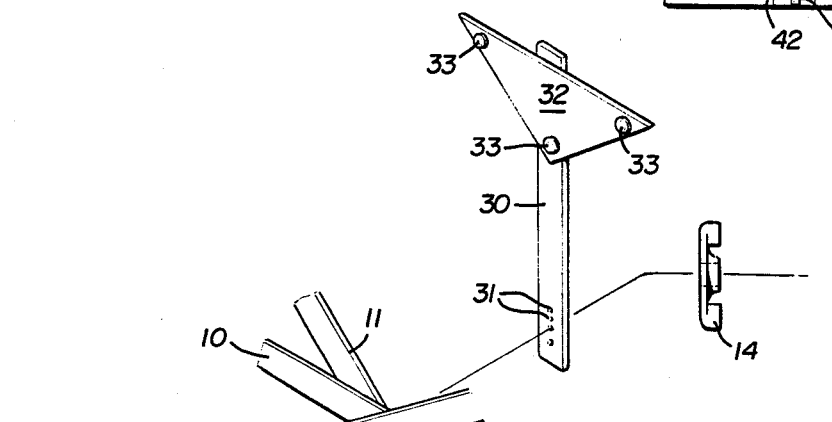
FIG. 7 is a fragmentary expolded perspective view of parts of the FIG. 6 embodiment.

FIG. 6 shows a second embodiment of the invention which is the same as that of FIGS. 1-5 except for the addition of a vertical piece 30 connected to the arms 10, 11 and 12 at the central pivot bolt 13. As shown in FIG. 7, near its lower end the vertical piece 30 has several vertically spaced openings 31, each of which is dimensioned to pass the shank 13b of the pivot bolt. This enables the height of the vertical piece to be selectively adjusted.

At its upper end the vertical piece 30 carries a triangular plate 32 with reflectors 33 on the front near each corner.

The vertical segment 30 extends up between the upper halves of arms 11 and 12 and positions the reflectors 33 on plate 32 at a slightly higher level than the reflectors 17 and 18 on the upper ends of arms 11 and 12.

In other respects the reflector assembly of FIGS. 6 and 7 is identical to that of FIGS. 1-5, and the same reference numerals are used for corresponding parts in the two embodiments.

Figure 8:
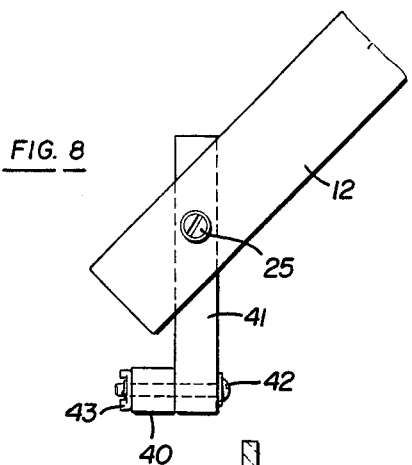
FIG. 8 is a fragmentary side elevational view showing a modified base for one arm of the reflector.
Figure 9:
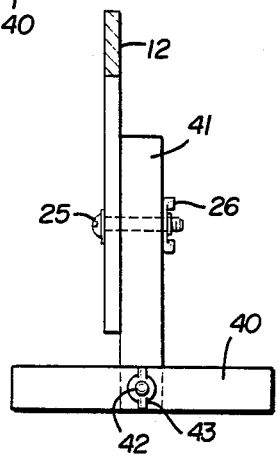
FIG. 9 is a front elevation of this base, taken from the left side of FIG. 8.

FIGS. 8 and 9 show a different base for each arm 11 and 12 than the one shown in FIGS. 1-7.

As shown for the arm 12, the base comprises a bottom piece 40 and an upstanding piece 41 to which the arm 12 is pivotally connected by a bolt 25 provided with a wing nut 26, as already described. The upstanding piece 41 is pivotally connected to the bottom piece by a bolt 42. A wing nut 43 threadedly engages the shank of bolt 42 to clamp pieces 40 and 41 together tightly. Preferably, the bottom piece is relatively long, (e.g. 12 to 20 inches) to provide a stable support.

The base for the other diagonal arm 11 is identical except that the bolt and wing nut assembly for the bottom and upstanding pieces is reversed end-to-end from the arrangement shown in FIG. 8.

When the reflector assembly is in its erected, operative position (comparable to the position shown in FIG. 1 for the first embodiment) the bottom piece 40 of the base engages the road and it is elongated parallel to the plane of the arm 12. Usually, the upstanding piece 41 will extend vertically up from the bottom piece 40 but, if desired, it can extend up at an acute angle. The wing nuts 26 and 43 are tightened to hold the assembly erect with the arms 10, 11 and 12 spread angularly as shown in FIG. 1.

The reflector assembly can be collapsed by loosening the wing nuts so that the arms 10, 11 and 12 are aligned, one behind the other, the bottom piece 40 of each base is turned to align it with the upstanding piece 41 of that base, and the upstanding piece 41 of each base is turned to align it with the corresponding arm 11 or 12.

I claim:

1. A collapsible reflector assembly for road use comprising:
   a plurality of elongated arms, each having opposite ends;
   light reflective means on said arms;
   pivot means pivotally interconnecting said arms intermediate the opposite ends of each;
   a first ground engaging base on one end of one of said arms;
   and a second ground engaging base on one end of another of said arms;
   said bases when spread apart horizontally positioning said arms extending upward diagonally and crossing each other at said pivot means;
   manually releasable clamping means for selectively clamping said arms spread apart in different angular positions about said pivot means or substantially aligned with each other, one behind the other;
   said pivot means being a screw-threaded bolt;
   and said clamping means being a nut threadedly engaging said bolt;
   each of said arms being thin and substantially flat;
   and each of said bases comprising a bottom piece extending on opposite sides and substantially perpendicular to the plane of the arm to which that base is pivotally connected, and an upstanding piece extending up from said bottom piece substantially parallel to the plane of the arm to which that base is pivotally connected;
   a respective screw-threaded bolt pivotally connecting said upstanding piece of each base to the corresponding arm;
   and a respective nut threadedly engaging said last-mentioned bolt to clamp each base to the corresponding arm.

2. A collapsible reflector assembly for road use comprising:
   a plurality of elongated arms, each having opposite ends;
   light reflective means on said arms;
   pivot means pivotally interconnecting said arms intermediate the opposite ends of each;
   a first ground engaging base on one end of one of said arms;
   and a second ground engaging base on one end of another of said arms;
   said base when spread apart horizontally positioning said arms extending upward diagonally and crossing each other at said pivot means;
   each of said arms being thin and substantially flat;
   and each of said bases comprising an elongated bottom piece extending substantially parallel to the plane of the corresponding arm, and an up- standing piece extending up from said bottom piece to the corresponding arm;
   and further comprising:
   a respective screw-threaded bolt pivotally connecting said upstanding piece of each base to the corresponding arm;
   a respective nut threadedly engaging said last-mentioned bolt to clamp said upstanding piece of the base to the corresponding arm;
   a respective screw-threaded bolt pivotally connecting said upstanding piece of each base to the bottom piece of the same base;
   and a respective nut threadedly engaging said last-mentioned nut to clamp said upstanding piece of the base to the bottom piece of the same base for allowing said bottom pieces to be pivoted to a position substantially perpendicular to the plane of the corresponding arm.

* * * * *